(12) United States Patent
Takamoto et al.

(10) Patent No.: US 11,989,711 B2
(45) Date of Patent: May 21, 2024

(54) POS PERIPHERAL DEVICE AND CONTROL METHOD FOR POS PERIPHERAL DEVICE

(71) Applicant: SEIKO EPSON CORPORATION, Tokyo (JP)

(72) Inventors: Akio Takamoto, Nagano (JP); Kazuaki Yoshida, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 300 days.

(21) Appl. No.: 17/191,758

(22) Filed: Mar. 4, 2021

(65) Prior Publication Data
US 2021/0279701 A1 Sep. 9, 2021

(30) Foreign Application Priority Data
Mar. 6, 2020 (JP) ................. 2020-038523

(51) Int. Cl.
G06Q 20/00 (2012.01)
G06F 3/12 (2006.01)
G06F 3/147 (2006.01)
G06Q 20/20 (2012.01)

(52) U.S. Cl.
CPC ........... G06Q 20/20 (2013.01); G06F 3/1204 (2013.01); G06F 3/1236 (2013.01); G06F 3/147 (2013.01)

(58) Field of Classification Search
CPC .... G06Q 20/20; G06Q 20/202; G06F 3/1204; G06F 3/1236; G06F 3/147; G06F 3/1229; G06F 3/1284; G09G 2320/08; G07G 1/0009; G07G 1/0018; B41J 29/38
USPC .......................................................... 705/16
See application file for complete search history.

(56) References Cited

U.S. PATENT DOCUMENTS

| | | | |
|---|---|---|---|
| 8,427,659 B2 | 4/2013 | Okuhara | |
| 9,582,229 B2 | 2/2017 | Shimizu et al. | |
| 2009/0327530 A1 | 12/2009 | Youn | |
| 2010/0118326 A1 | 5/2010 | Okuhara | |
| 2012/0072617 A1 | 3/2012 | Miyasaka et al. | |
| 2014/0036307 A1* | 2/2014 | Kani | G06F 3/1257 358/1.15 |
| 2016/0210090 A1* | 7/2016 | Shimizu | G06F 3/1231 |
| 2016/0253645 A1* | 9/2016 | Ciabarra | G07G 1/0009 705/21 |
| 2022/0237580 A1* | 7/2022 | Gonzales | G06Q 20/208 |

FOREIGN PATENT DOCUMENTS

| | | | | |
|---|---|---|---|---|
| CN | 1871613 A | * | 11/2006 | ............. G06Q 20/04 |
| CN | 110679155 A | * | 1/2020 | ................ H04R 1/10 |
| CN | 107005619 B | * | 12/2020 | ............. G06Q 20/00 |
| EP | 2605122 A2 | * | 6/2013 | ........... G06F 3/1204 |

(Continued)

*Primary Examiner* — Russell S Glass
(74) *Attorney, Agent, or Firm* — Global IP Counselors, LLP

(57) ABSTRACT

A POS peripheral device includes a storing section configured to store setting information and a control section configured to control the storing section. When a first device is connected as an external device, the control section transmits, to the first device, information indicating that the POS peripheral device operates as a communication device. When a second device is connected as the external device, the control section transmits, to the second device, information indicating that the POS peripheral device operates as a storage that stores information in the storing section.

10 Claims, 5 Drawing Sheets

(56) References Cited

FOREIGN PATENT DOCUMENTS

| | | | | | |
|---|---|---|---|---|---|
| GB | 2524593 A | * | 9/2015 | ........... | G06F 1/1626 |
| JP | 2005-128869 A | | 5/2005 | | |
| JP | 2010-117949 A | | 5/2010 | | |
| JP | 2015-195038 A | | 11/2015 | | |
| JP | 2017-052296 A | | 3/2017 | | |
| JP | 2017052296 A | * | 3/2017 | ........... | G06F 3/1205 |
| KR | 10-2009-0057650 A | | 6/2009 | | |

\* cited by examiner

POS PERIPHERAL DEVICE AND CONTROL METHOD FOR POS PERIPHERAL DEVICE

The present application is based on, and claims priority from JP Application Serial Number 2020-038523, filed Mar. 6, 2020, the disclosure of which is hereby incorporated by reference herein in its entirety.

BACKGROUND

1. Technical Field

The present disclosure relates to a POS peripheral device and a control method for the POS peripheral device.

2. Related Art

Researches and developments about a POS peripheral device connected to a POS (Point Of Sale) terminal have been performed. The POS peripheral device is, for example, a customer display, a scanner, a printing device, a change machine, a card reader, a card writer, or a CAT (Credit Authorization Terminal).

A printing device that, after a power supply is turned on, reads setting information stored in an external storage device and writes the read setting information in a storing section to thereby set the setting information in the printing device is known as an example of the POS peripheral device (see JP-A-2017-052296 (Patent Literature 1)).

In the printing device described in Patent Literature 1, when the setting information is stored in the storing section, the external storage device needs to be connected and disconnected at predetermined timing. However, such connection and disconnection of the external storage device are complicated for a user of the printing device. Accordingly, in this case, wrong operation is sometimes performed in the printing device. In other POS peripheral devices in which setting information is stored by the same method as the method of storing the setting information in the printing device, wrong operation is sometimes performed as in the printing device.

SUMMARY

An aspect of the present disclosure is directed to a POS peripheral device including: a storing section configured to store setting information; and a control section configured to control the storing section. When a first device is connected as an external device, the control section transmits, to the first device, information indicating that the POS peripheral device operates as a communication device. When a second device is connected as the external device, the control section transmits, to the second device, information indicating that the POS peripheral device operates as a storage that stores information in the storing section.

Another aspect of the present disclosure is directed to a control method for a POS peripheral device including a storing section configured to store setting information, the control method including: when a first device is connected as an external device, transmitting, to the first device, information indicating that the POS peripheral device operates as a communication device; and when a second device is connected as the external device, transmitting, to the second device, information indicating that the POS peripheral device operates as a storage that stores information in the storing section.

DESCRIPTION OF EXEMPLARY EMBODIMENTS

Embodiment

An embodiment of the present disclosure is explained below with reference to the drawings.

Overview of a POS Peripheral Device

First, an overview of a POS peripheral device according to the embodiment is explained.

The POS peripheral device includes a storing section that stores setting information and a control section that controls the storing section. When a first device is connected as an external device, the control section transmits, to the first device, information indicating that the POS peripheral device operates as a communication device. When a second device is connected as the external device, the control section transmits, to the second device, information indicating that the POS peripheral device operates as a storage that stores information in the storing section.

Consequently, the POS peripheral device according to the embodiment can easily write the setting information in the storing section. Each of the configuration of the POS peripheral device and processing in which the POS peripheral device performs different operations according to devices connected as the external device is explained in detail below.

The POS peripheral device is, for example, a customer display, a scanner, a printing device, a change machine, a card reader, a card writer, or a CAT (Credit Authorization Terminal). A customer display is explained below as an example of the POS peripheral device according to the embodiment.

Configuration of the Customer Display

The configuration of a customer display 10, which is an example of the POS peripheral device according to the embodiment, is explained below.

Figure 1:
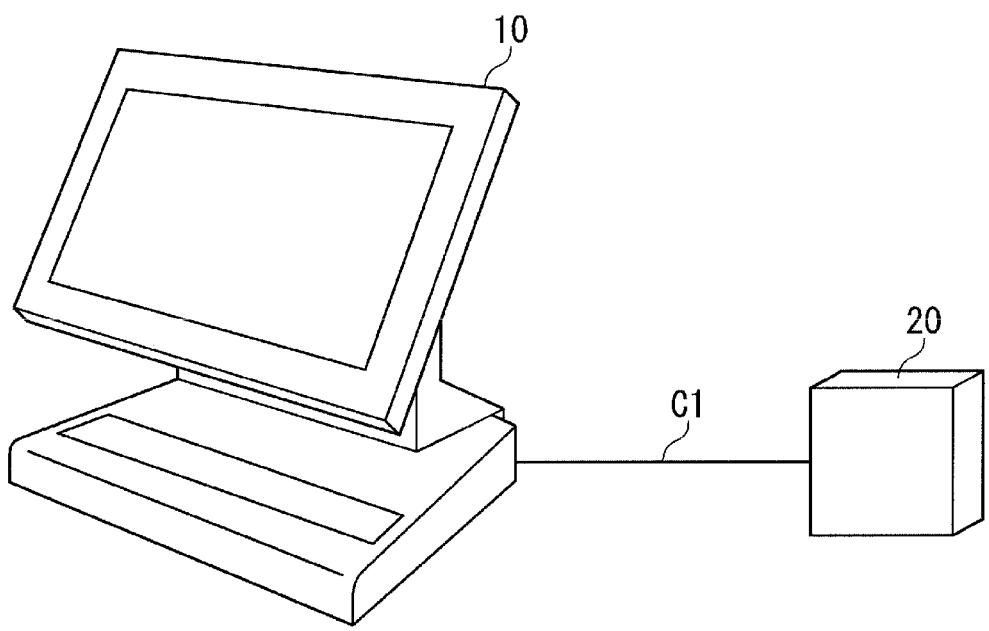
FIG. 1 is a diagram showing an example of the exterior of a customer display.

FIG. 1 is a diagram showing an example of the exterior of the customer display 10.

The customer display 10 is a display device including a liquid crystal display panel or an organic EL (Electroluminescence) display panel.

The customer display 10 is communicably connected to an external device 20. The customer display 10 receives image information indicating an image from the external device 20 and displays the image indicated by the received image information. For example, the customer display 10 displays an image of an advertisement for sales promotion. That is, the customer display 10 is, for example, a display device that displays, in a certain store, a desired image for customers of the store.

The customer display 10 is communicably connected to the external device 20 via a cable C1. The cable C1 is a communication cable that connects the external device 20 and the customer display 10. Accordingly, a communication connector 11 is provided in the customer display 10. The communication connector 11 is a connector connected to the cable C1 by inserting the cable C1 into the connector. In FIG. 1, the communication connector 11 is not seen because the communication connector 11 is located on the rear side of the customer display 10.

The communication connector 11 is, for example, a connector to which a USB (Universal Serial Bus) cable is connectable. In this case, the cable C1 is a USB cable. The communication connector 11 may be a connector to which a communication cable corresponding to another communication standard such as a Lighting (registered trademark) cable instead of the USB cable. In this case, the cable C1 is a communication cable corresponding to the other communication standard.

The external device 20 is a device connected to the customer display 10 via the cable C1. The external device 20 is a device separate from the customer display 10. The external device 20 may be any device if the device is connectable to the customer display 10 via the cable C1 and is separate from the customer display 10.

The external device 20 is, for example, an information processing device or a printing device. The information processing device is, for example, a notebook PC (Personal Computer), a tablet PC, a multifunction cellular phone terminal (a smartphone), a PDA (Personal Digital Assistant), a desktop PC, or a workstation. The printing device is, for example, a receipt printer. The information processing device may be an information processing device of another type instead of the notebook PC, the tablet PC, the multifunction cellular phone terminal, the PDA, the desktop PC, or the workstation. The printing device may be a printing device of another type instead of the receipt printer.

Hardware Configuration Included in the Inside of the Customer Display

Figure 2:
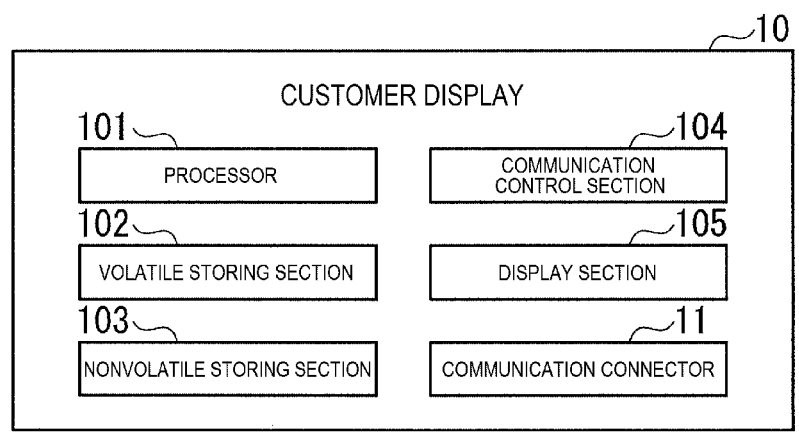
FIG. 2 is a diagram showing an example of a hardware configuration included in the inside of the customer display.

A hardware configuration included in the inside of the customer display 10 is explained with reference to FIG. 2. FIG. 2 is diagram showing an example of the hardware configuration included in the inside of the customer display 10.

As shown in FIG. 2, the customer display 10 includes a processor 101, a volatile storing section 102, a nonvolatile storing section 103, a communication control section 104, and a display section 105. In FIG. 2, for convenience of explanation, the communication connector 11 is shown together with the processor 101, the volatile storing section 102, the nonvolatile storing section 103, the communication control section 104, and the display section 105. The customer display 10 may include other hardware functional sections in addition to the processor 101, the volatile storing section 102, the nonvolatile storing section 103, the communication control section 104, and the display section 105.

The processor 101 is, for example, a CPU (Central Processing Unit). The processor 101 may be another processor such as an FPGA (Field Programmable Gate Array). The processor 101 is an example of the control section explained above.

The volatile storing section 102 is a storage device including a volatile storage region. The volatile storing section 102 is, for example, a RAM (Random Access Memory). The volatile storing section 102 may be another storage device if the storage device includes a volatile storage region.

The nonvolatile storing section 103 is a storage device including a nonvolatile storage region. The nonvolatile storing section 103 is, for example, a flash memory. The nonvolatile storing section 103 may be another storage device if the storage device includes a nonvolatile storage region. The nonvolatile storing section 103 is an example of the storing section explained above.

The communication control section 104 is a circuit that controls communication with the external device 20 via the communication connector 11. The communication control section 104 is controlled by the processor 101. The communication control section 104 may include a processor. In this case, the processor may include a function of controlling the communication control section 104 among functions of the processor 101. In this case, the processor is an example of the control section. The communication control section 104 includes a buffer. If a storage region of the buffer included in the communication control section 104 is increased, the processor 101 can use the buffer instead of the volatile storing section 102.

The display section 105 is a display panel on which the customer display 10 displays an image and is, for example, a liquid crystal display panel or an organic EL display panel.

Operation performed by the customer display according to a device connected as the external device The customer display 10 performs different operations according to devices connected as the external device 20. Therefore, operations performed by the customer display 10 according to devices connected as the external device 20 are explained below. In the following explanation, as an example, the devices connected as the external device 20 are two devices, that is, an information processing device and a printing device. That is, in the following explanation, as an example, the customer display 10 performs operations different from each other according to connection via the cable C1 of the respective two devices connected as the external device 20. In other words, in the following explanation, as an example, the customer display 10 performs different operations when the information processing device is connected as the external device 20 and when the printing device is connected as the external device 20. The customer display 10 may perform operations different from one another according to connection via the cable C1 of respective three or more devices connected as the external device 20.

When the information processing device is connected as the external device 20, the customer display 10 operates as a storage that stores information in the nonvolatile storing section 103. Accordingly, in this case, the customer display 10 transmits storage information to the information processing device connected as the external device 20. The storage information is, for example, a device descriptor including a mass storage class code indicating that the customer display 10 is the storage. The storage information may be other information capable of indicating that the customer display 10 operates as the storage. Consequently, the external device 20 connected to the customer display 10 in this case can specify that the customer display 10 in this case is operating as the storage.

On the other hand, when the printing device is connected as the external device 20, the customer display 10 operates as a communication device. In other words, in this case, the customer display 10 operates as a display device capable of communicating with the printing device. That is, in this embodiment, the customer display 10 operating as the communication device means that the customer display 10 operates as the display device capable of communicating with the printing device. In order to operate as the communication device in this case, in this case, the customer display 10 transmits vendor information to the printing device connected as the external device 20. The vendor information is, for example, a device descriptor including a vendor class code indicating that the customer display 10 operates as the communication device. The vendor information may be other information capable of indicating that the customer display 10 operates as the communication device. Consequently, the external device 20 connected to the customer display 10 in this case can specify that the customer display 10 in this case is operating as the communication device.

Figure 3:
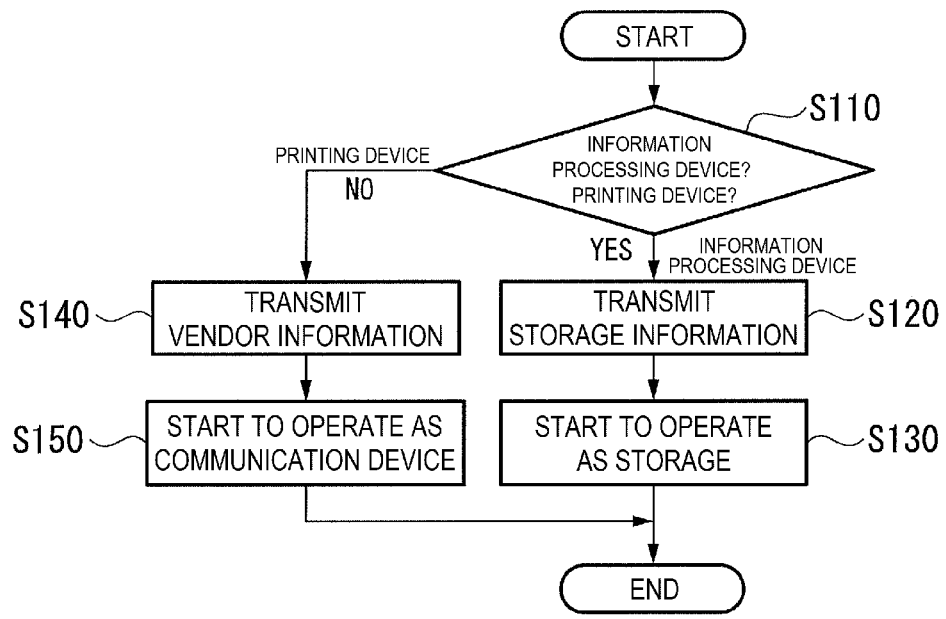
FIG. 3 is a diagram showing an example of a flow of processing in which the customer display starts operation corresponding to a device connected as an external device.

Processing in which the Customer Display Starts Operation Corresponding to a Device Connected as the External Device Processing in which the customer display 10 starts operation corresponding to a device connected as the external device 20 is explained with reference to FIG. 3. FIG. 3 is a diagram showing an example of a flow of the processing in which the customer display 10 starts operation corresponding to a device connected as the external device 20. In the following explanation, as an example, one of the information processing device and the printing device is connected to the customer display 10 as the external device 20 via the cable C1 at timing before processing in step S110 shown in FIG. 3 is performed.

The processor 101 determines which of the information processing device and the printing device a device connected as the external device 20 is (step S110). In FIG. 3, the processing in step S110 is described as "INFORMATION PROCESSING DEVICE? PRINTING DEVICE?"

The processing in step S110 is explained. In step S110, the processor 101 determines, according to which mode of two different modes communication with the device connected as the external device 20 is performed, which of the information processing device and the printing device is connected as the external device 20. The two different modes are modes distinguished by methods of communication with the device connected to the customer display 10 as the external device 20. For example, the two different modes are modes distinguished by communication speeds. In this case, the two different modes are modes for performing communication at communication speeds different from each other. Therefore, in the following explanation, as an example, the two different modes are modes for performing communication at communication speeds different from each other. In the following explanation, for convenience of explanation, one of the two different modes is referred to as first mode and the other of the two different modes is referred to as second mode. In the following explanation, as an example, communication between the printing device connected as the external device 20 and the customer display 10 is performed in the first mode and communication between the information processing device connected as the external device 20 and the customer display 10 is performed in the second mode. That is, in step S110, the processor 101 determines whether the communication with the device connected as the external device 20 is communication performed in the first mode or communication performed in the second mode. The processor 101 can determine, for example, according to enumeration performed with the external device 20 when the external device 20 is connected, whether the communication with the device connected as the external device 20 is communication performed in the first mode or communication performed in the second mode. When determining that the communication with the device connected as the external device 20 is the communication in the first mode, the processor 101 determines that the device is the printing device. On the other hand, when determining that the communication with the device connected as the external device 20 is the communication in the second mode, the processor 101 determines that the device is the information processing device.

The processor 101 may be configured to determine, with another method, whether the communication with the device connected as the external device 20 is the communication performed in the first mode or the communication performed in the second mode. The first mode is, for example, a mode for performing communication at predetermined first speed. The second mode is, for example, a mode for performing communication at second speed different from the first speed. In this embodiment, the cable C1 is a USB cable. In this case, the first speed is Full Speed. When the first speed is the Full Speed, the second speed is speed higher than the Full Speed and is, for example, High Speed or Super Speed.

When determining that the information processing device is connected as the external device 20 (YES in step S110), the processor 101 transmits storage information to the external device 20 (step S120).

Subsequently, the processor 101 starts to operate as a storage (S130) and ends the processing of the flowchart of FIG. 3. The processing in step S120 and the processing in step S130 may be performed in parallel or may be performed in the opposite order.

On the other hand, when determining that the printing device is connected as the external device 20 (NO in step S110), the processor 101 transmits vendor information to the external device 20 (step S140).

Subsequently, the processor 101 starts to operate as the communication device (step S150) and ends the processing of the flowchart of FIG. 3. The processing in step S140 and the processing in step S150 may be performed in parallel or may be performed in the opposite order.

In this way, when the printing device is connected as the external device 20, the customer display 10 transmits, to the printing device, information indicating that the customer display 10 operates as the communication device. When the information processing device is connected as the external device 20, the customer display 10 transmits, to the information processing device, information indicating that the customer display 10 operates as the storage that stores information in the nonvolatile storing section 103. More specifically, when the customer display 10 is connected to the external device 20, the customer display 10 determines whether communication with the external device 20 is the communication in the first mode or the communication in the second mode. When determining that the communication with the external device 20 is the communication in the first mode, the customer display 10 determines that the printing device is connected as the external device 20 and transmits the vendor information to the printing device. When determining that the communication with the external device 20 is the communication in the second mode, the customer display 10 determines that the information processing device is connected as the external device 20 and transmits the storage information to the information processing device. Consequently, the customer display 10 can easily write setting information in the storage section as explained below.

When performing the enumeration explained above, the processor 101 is operating as the communication device. That is, when the processor 101 is connected to the external device 20, the processor 101 starts to operate as the communication device irrespective of whether the external device 20 is the information processing device or the printing device. Thereafter, as explained above, the processor 101 determines whether the communication with the external device 20 is the communication in the first mode or the communication in the second mode. When determining that the communication with the external device 20 is the communication in the second mode, the processor 101 determines that the information processing device is connected as the external device 20, blocks communication with the information processing device, and stops operating as the communication device. Thereafter, the processor 101 starts to operate as the storage and resumes the communication with the information processing device. The blocking of the communication with the information processing device by the processor 101 is realized by, for example, a method of dropping levels of respective signals of a D+ line and a D− line of the cable C1 to a low level by 100 ms or more.

Processing in which the Customer Display Stores Setting Information Received from the Information Processing Device Connected as the External Device When operating as the storage and receiving setting information from the information processing device, the customer display 10 causes the nonvolatile storing section 103 to store the received setting information. Thereafter, as explained below, when starting the operation as the communication device, the customer display 10 reads, from the nonvolatile storing section 103, the setting information stored in the nonvolatile storing section 103 and sets the read setting information. Consequently, a user of the customer display 10 can change the setting information set in the customer display 10 to desired setting information via the information processing device connected to the customer display 10 as the external device 20. Therefore, in the following explanation, processing in which the customer display 10 stores setting information received from the information processing device connected as the external device 20 is explained.

The setting information means information including various kinds of information set in the customer display 10. The setting information includes, for example, display setting information, communication setting information, and firmware information.

The display setting information means information including various kinds of information set in the customer display 10 concerning display performed by the customer display 10. The display setting information includes, for example, a part or all of registered image information, font information, image position information, slide show information, display illuminance information, and the like. The registered image information means image information indicating an image to be displayed by the display section 105. The registered image information may be any image information if the image information is image information indicating an image that can be displayed by the display section 105. The registered image information is, for example, image information indicating an image of a logo of a shop, an image of an advertisement for sales promotion, or the like. The registered image information included in the display setting information may be one kind of registered image information or may be a plurality of kinds of registered image information. The font information means information indicating a font used by the customer display 10 for display. The image position information means information indicating a position where the image indicated by the registered image information is displayed. The slide show information means information including information concerning a slide show performed based on the image indicated by the registered image information such as information indicating time periods in which respective images are displayed in the slide show. The display illuminance information means information indicating illuminance of an image displayed on the display section 105 by the customer display 10. The display setting information may include other information concerning the display of the image performed by the customer display 10.

The communication setting information means information set in the customer display 10 concerning communication with other devices via a network. The communication setting information includes, for example, a part or all of an IP (Internet Protocol) address, a subnet mask, a gateway, access point information, security information, and the like. The access point information is information indicating an access point to which the customer display 10 is connected via radio, for example, an SSID (Service Set Identifier). The security information is information concerning security in communication performed by the customer display 10. The security information includes, for example, a part or all of information indicating a WEP (Wired Equivalent Privacy) key, information indicating WPS (Wi-Fi Protected Setup), and the like. Wi-Fi is a registered trademark.

The firmware information is information concerning firmware installed in the customer display 10. The firmware information includes, for example, a part or all of firmware installed in the customer display 10, information for updating the firmware installed in the customer display 10, and the like.

Figure 4:
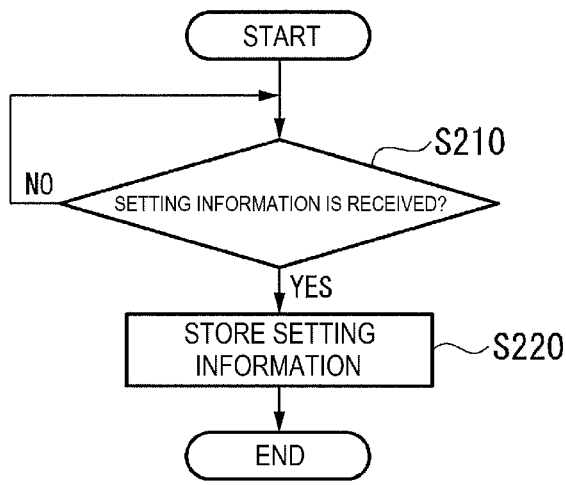
FIG. 4 is a diagram showing an example of a flow of processing in which the customer display stores setting information received from an information processing device connected as the external device.

FIG. 4 is a diagram showing an example of a flow of processing in which the customer display 10 stores setting information received from the information processing device connected as the external device 20. In the following explanation, as an example, the information processing device is connected to the customer display 10 as the external device 20 via the cable C1 at timing before the processing in step S210 shown in FIG. 4 is performed. That is, in the following explanation, the customer display 10 is starting to operate as the storage at the timing. In other words, in the following explanation, the customer display 10 is transmitting the storage information to the information processing device at the timing.

The processor 101 stays on standby until the processor 101 receives setting information from the information processing device connected as the external device 20 (step S210).

When determining that setting information is received from the information processing device connected as the external device 20 (YES in step S210), the processor 101 causes the nonvolatile storing section 103 to store the received setting information (step S220) and ends the processing of the flowchart of FIG. 4.

In this way, when the information processing device is connected as the external device 20, after transmitting the storage information to the information processing device, when receiving the setting information from the information processing device, the customer display 10 causes the nonvolatile storing section 103 to store the setting information received from the information processing device. Consequently, the user of the customer display 10 can easily cause the customer display 10 to store desired setting information via the information processing device without performing complicated procedures in order one by one.

Processing in which the Customer Display Sets Stored Setting Information

Figure 5:
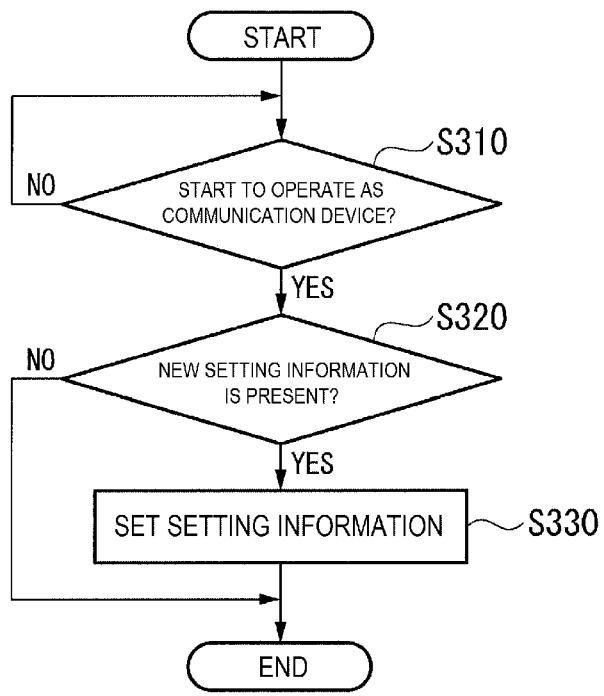
FIG. 5 is a diagram showing an example of a flow of processing in which the customer display sets setting information stored in a nonvolatile storing section.

Processing in which the customer display 10 sets the setting information stored in the nonvolatile storing section 103 by the processing of the flowchart of FIG. 5 is explained. FIG. 5 is a diagram showing an example of a flow of the processing in which the customer display 10 sets the setting information stored in the nonvolatile storing section 103. In the following explanation, as an example, one of the printing device and the information processing device is connected as the external device 20 at timing before the processing in step S310 shown in FIG. 5 is performed. In the following explanation, as an example, the customer display 10 is turned on and started at the timing.

The processor 101 stays on standby until the processor 101 starts to operate as the communication device (step S310). That is, in step S310, when the information processing device is connected to the customer display 10 as the external device 20, the processor 101 starts to operate as the storage and does not transition to step S320. On the other hand, in step S310, when the printing device is connected to the customer display 10 as the external device 20, the processor 101 starts to operate as the communication device and transitions to step S320.

When determining that the processor 101 starts to operate as the communication device (YES in step S310), the processor 101 determines whether new setting information is present (step S320). For example, when determining based on a history of storage in the nonvolatile storing section 103 that new information is added to or overwritten on setting information stored in advance or when new information is stored as new setting information, the processor 101 determines that new setting information is present.

When determining that new setting information is absent (NO in step S320), the processor 101 determines that setting information already set is the latest setting information and ends the processing of the flowchart of FIG. 5.

On the other hand, when determining that new setting information is present (YES in step S320), the processor 101 sets the setting information stored in the nonvolatile storing section 103 (step S330) and ends the processing of the flowchart of FIG. 5.

The processing in step S330 is explained. In step S330, when display setting information is included in the setting information stored in the nonvolatile storing section 103, the customer display 10 designates a storage region where the display setting information is stored to the firmware as a reference destination where the firmware refers to the display setting information when the customer display 10 causes the display section 105 to perform display. In step S330, when communication setting information is included in the setting information, the customer display 10 designates the storage region where the communication setting information is stored to the firmware as a reference destination where the firmware refers to the communication setting information when the customer display 10 performs communication. When firmware information is included in the setting information, the customer display 10 performs installation of the firmware or update of the firmware.

In this way, according to the processing of the flowchart of FIG. 4, the customer display 10 sets the setting information stored in the nonvolatile storing section 103. More specifically, when the setting information is stored in the nonvolatile storing section 103 and the customer display 10 starts to operate as the communication device, the customer display 10 sets the setting information stored in the nonvolatile storing section 103. Consequently, the user of the customer display 10 can set, in the customer display 10, the setting information stored in the customer display 10 via the information processing device without performing new operation on the customer display 10. As a result, for example, the customer display 10 can easily cause the user to change an image that the user causes the customer display 10 to display. As a result, for example, the user of the customer display 10 can easily cause the customer display 10 to display a desired image via the information processing device without performing complicated procedures one by one.

Processing in which the Customer Display Displays Received Image Information

Figure 6:
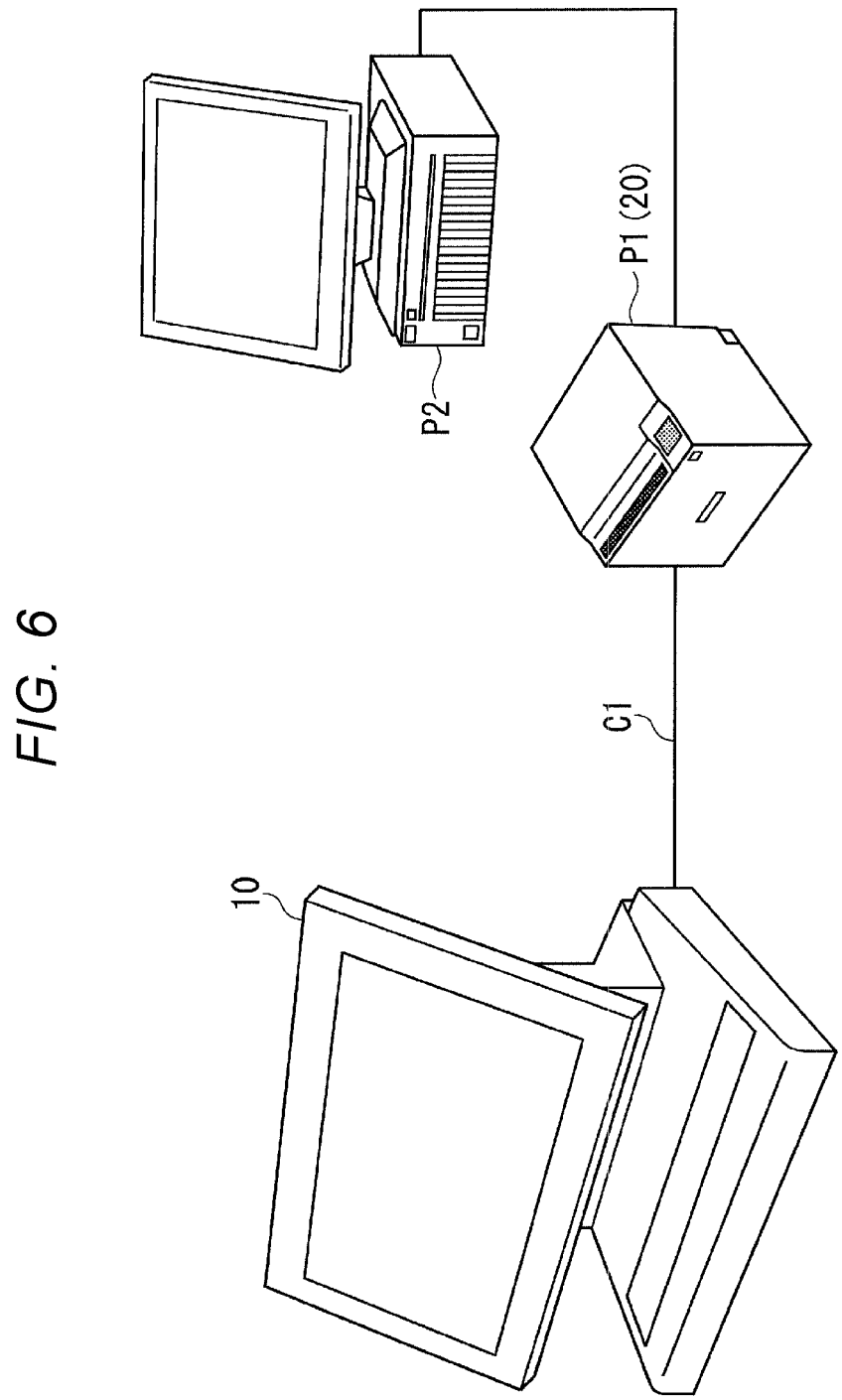
FIG. 6 is a diagram showing an example of a state in which a printing device is connected to the customer display as the external device and an information processing device is connected to the printing device connected to the customer display as the external device.

When the customer display 10 is operating as the communication device and receives image information from the external device 20 or receives, via the external device 20, image information from another device connected to the external device 20, the customer display 10 causes the display section 105 to display an image indicated by the received image information. Therefore, in the following explanation, processing in which the customer display 10 displays image information received when the customer display 10 is operating as the communication device is explained. In the following explanation, as an example, as shown in FIG. 6, a printing device P1 is connected to the customer display 10 as the external device 20 and an information processing device P2 is connected to the printing device P1 connected to the customer display 10 as the external device 20. FIG. 6 is a diagram showing an example of a state in which the printing device P1 is connected to the customer display 10 as the external device 20 and the information processing device P2 is connected to the printing device P1 connected to the customer display 10 as the external device 20. In the example shown in FIG. 6, the printing device P1 and the information processing device P2 are communicably connected via a cable. However, the printing device P1 and the information processing device P2 may be communicably connected by radio. The printing device P1 is, for example, a receipt printer. The information processing device P2 is, for example, a POS terminal.

Figure 7:
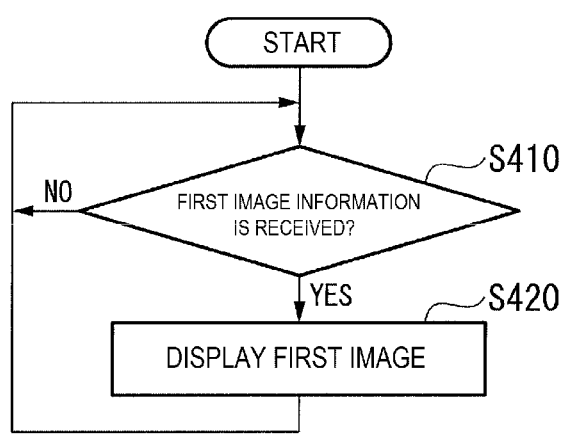
FIG. 7 is a diagram showing an example of a flow of processing in which the customer display displays first image information received when the customer display is operating as a communication device.

FIG. 7 is a diagram showing an example of a flow of processing in which the customer display 10 displays first image information received when the customer display 10 is operating as the communication device. In the following explanation, for convenience of explanation, image information received by the customer display 10 in this case is referred to as the first image information. In the following explanation, for convenience of explanation, an image indicated by the first image information is referred to as first image. In the following explanation, as an example, the printing device P1 is connected to the customer display 10 as the external device 20 and the information processing device P2 is connected to the printing device P1 at timing before the processing in step S410 shown in FIG. 7 is performed. In the following explanation, as an example, the customer display 10 is starting to operate as the communication device at the timing. That is, in the following explanation, the customer display 10 is transmitting vendor information to the printing device P1 at the timing.

The processor 101 stays on standby until the processor 101 receives the first image information from the information processing device P2 via the printing device P1 (step 3410).

When determining that the first image information is received from the information processing device P2 via the printing device P1 (YES in step S410), the processor 101 causes the display section 105 to display the first image indicated by the received first image information (step S420). The first image information received by the processor 101 in step S410 is information received by the printing device P1 from the information processing device P2. After the processing in step S420 is performed, the processor 101 transitions to step S410 and stays on standby again until the processor 101 receives the first image information from the information processing device P2 via the printing device P1.

In this way, when the printing device P1 is connected as the external device 20, after transmitting the vendor information to the printing device P1, when receiving the first image information indicating the first image from the printing device P1, the customer display 10 causes the display section 105 to display the first image indicated by the first image information received from the printing device P1. Consequently, by transmitting the first image information from the information processing device P2 to the customer display 10 via the printing device P1, the user of the customer display 10 can easily cause the customer display 10 to display a desired image without performing complicated procedures one by one.

Operation similar to the operation performed by the customer display 10 explained above can also be realized by including, in a customer display of related art, a USB controller having a function capable of causing an external device connected to the customer display to virtually recognize the customer display as two devices, that is, a communication device and a storage. However, in such a method, cost is increased by the USB controller included in the customer display. It is also possible that the customer display operates in two operation modes, that is, a mode in which the customer display operates as the communication device and a mode in which the customer display operates as the storage and, according to operation received by the customer display, the customer display operates in one of the two operation mode. However, in such a method, a button or the like for receiving the operation needs to be provided in the customer display. Cost of the customer display increases.

In contrast, as explained above, the customer display 10 switches to operate as the communication device and operate as the storage device according to a method of communication with the device connected as the external device 20. Therefore, it is possible to easily write setting information in the storing section without increasing cost.

As explained above, a POS peripheral device according to the embodiment includes a storing section configured to store setting information and a control section configured to control the storing section. When a first device is connected as an external device, the control section transmits, to the first device, information indicating that the POS peripheral device operates as a communication device. When a second device is connected as the external device, the control section transmits, to the second device, information indicating that the POS peripheral device operates as a storage that stores information in the storing section. Consequently, the POS peripheral device can easily write the setting information in the storing section. In the example explained above, the customer display 10 is an example of the POS peripheral device. In the example explained above, the nonvolatile storing section 103 is an example of the storing section. In the example explained above, the processor 101 is an example of the control section. In the example explained above, each of the printing device and the printing device P1 is an example of the first device. In the example explained above, each of the information processing device and the information processing device P2 is an example of the second device. In the example explained above, the vendor information is an example of the information indicating that the POS peripheral terminal operates as the communication device. In the example explained above, the storage information is an example of information indicating that the POS peripheral device operates as the storage that stores information in the storing section.

In the POS peripheral device, a configuration may be used in which the POS peripheral device further includes a display section configured to display an image indicated by image information and, when the first device is connected as the external device, after transmitting, to the first device, information indicating that the POS peripheral device operates as the communication device, when receiving first image information indicating a first image from the first device, the control section causes the display section to display the first image indicated by the first image information received from the first device. In the example explained above, the display section 105 is an example of the display section.

In the POS peripheral device, a configuration may be used in which the setting information includes image information indicating an image that the control section can cause the display section to display. In the example explained above, the registered image information is an example of the image information included in the setting information.

In the POS terminal device, a configuration may be used in which the first image information is information received by the first device from an information processing device connected to the first device.

In the POS peripheral device, a configuration may be used in which, when a second device is connected as the external device, after transmitting, to the second device, the information indicating that the POS peripheral device operates as the storage, when receiving the setting information from the second device, the control section causes the storing section to store the setting information received from the second device.

In the POS peripheral device, a configuration may be used in which, when the POS peripheral device is connected to the external device, the control section determines whether communication with the external device is communication in a first mode or communication in a second mode different from the first mode and, when determining that the communication with the external device is the communication in the first mode, determines that the first device is connected as the external device and transmits, to the first device, the information indicating that the POS peripheral device operates as the communication device and, when determining that the communication with the external device is the communication in the second mode, determines that the second device is connected as the external device and transmits, to the second device, the information indicating that the POS peripheral device operates as the storage.

In the POS peripheral device, a configuration may be used in which, when the POS peripheral device is connected to the external device, the control section starts to operate as the communication device and, thereafter, determines whether the communication with the external device is the communication in the first mode or the communication in the second mode.

In the POS peripheral device, a configuration may be used in which, when the POS peripheral device is connected to the external device, the control section starts to operate as the communication device and, thereafter, determines whether the communication with the external device is the communication in the first mode or the communication in the second mode and, when determining that the communication with the external device is the communication in the second mode, determines that the second device is connected as the external device, blocks the communication with the second device, stops operating as the communication device, and then starts to operate as the storage and resumes the communication with the second device.

A configuration may be used in which the POS peripheral device is a customer display. In the example explained above, the customer display 10 is an example of the customer display.

In the POS peripheral device, a configuration may be used in which the first device is a printing device and the second device is an information processing device.

The embodiment of the present disclosure is explained above with reference to the drawings. However, a specific configuration is not limited to this embodiment. The embodiment may be, for example, changed, substituted, or deleted without departing from the gist of the present disclosure.

A program for realizing a function of any component in the device explained above may be recorded in a computer-readable recording medium and executed by causing a computer system to read the program. The device is, for example, the customer display 10 or the external device 20. The "computer system" includes an OS (Operating System) and hardware such as a peripheral device. The "computer-readable recording medium" means a portable medium such as a flexible disk, a magneto-optical disk, a ROM, or a CD (Compact Disk)-ROM or a storage device such as a hard disk incorporated in the computer system. Further, the "computer-readable recording medium" also includes a recording medium that retains a program for a fixed time like a volatile memory on the inside of a computer system functioning as a server or a client when the program is transmitted via a network such as the Internet or a communication line such as a telephone line.

The program may be transmitted from a computer system, which stores the program in a storage device or the like, to another computer system via a transmission medium or a transmission wave in the transmission medium. The "transmission medium" for transmitting the program means a medium having a function of transmitting information like a network such as the Internet or a communication line such as a telephone line.

The program may be a program for realizing a part of the functions explained above. Further, the program may be a program that can realizes the functions explained above in combination with a program already recorded in the computer system, a so-called differential file or differential program.

What is claimed is:

1. A POS peripheral device comprising:
    a storing section configured to store setting information; and
    a control section configured to control the storing section, wherein
    the control section is configured to determine whether communication with an external device connected to the POS peripheral device via a USB cable is in a first mode or in a second mode by performing enumeration with the external device, and to determine that the external device is a first external device when the communication is in the first mode in which the communication is performed at a first speed and that the external device is a second external device when the communication is in the second mode in which the communication is performed at a second speed different from the first speed,
    when the control section determines the communication is in the first mode the control section transmits, to the first external device, information indicating that the POS peripheral device operates as a communication device, and
    when the control section determines the communication is in the second mode, the control section transmits, to the second external device, information indicating that the POS peripheral device operates as a storage that stores information in the storing section.

2. The POS peripheral device according to claim 1, further comprising a display section configured to display an image indicated by image information, wherein
    when the first external device is connected to the POS peripheral device, after transmitting, to the first external device, the information indicating that the POS peripheral device operates as the communication device, when receiving first image information indicating a first image from the first external device, the control section causes the display section to display the first image.

3. The POS peripheral device according to claim 2, wherein the setting information includes image information indicating an image that the control section can cause the display section to display.

4. The POS peripheral device according to claim 2, wherein the first image information is information received by the first external device from an information processing device connected to the first external device.

5. The POS peripheral device according to claim 1, wherein, when the second external device is connected to the POS peripheral device, after transmitting, to the second external device, the information indicating that the POS peripheral device operates as the storage, when receiving the setting information from the second external device, the control section causes the storing section to store the setting information received from the second external device.

6. The POS peripheral device according to claim 1, wherein, when the POS peripheral device is connected to the first external device or the second external device, the control section starts to operate as the communication device and, thereafter, determines whether the communication is in the first mode or in the second mode.

7. The POS peripheral device according to claim 6, wherein, when the POS peripheral device is connected to the first external device or the second external device, the control section starts to operate as the communication device and, thereafter, determines whether the communication is in the first mode or in the second mode and, when determining that the communication is in the second mode, determines that the second external device is connected to the POS peripheral device, blocks the communication with the second external device, stops operating as the communication device, and then starts to operate as the storage and resumes the communication with the second external device.

8. The POS peripheral device according to claim 1, wherein the POS peripheral device is a customer display.

9. The POS peripheral device according to claim 1, wherein
the first external device is a printing device, and
the second external device is an information processing device.

10. A control method for a POS peripheral device including a storing section configured to store setting information, the control method comprising:
determining whether communication with an external device connected to the POS peripheral device via a USB cable is in a first mode or in a second mode by performing enumeration with the external device;
determining that the external device is a first external device when the communication is in the first mode in which the communication is performed at a first speed and that the external device is a second external device when the communication is in the second mode in which the communication is performed at a second speed;
when the first external device is connected to the POS peripheral device, transmitting, to the first external device, information indicating that the POS peripheral device operates as a communication device; and
when the second external device is connected to the POS peripheral device, transmitting, to the second external device, information indicating that the POS peripheral device operates as a storage that stores information in the storing section.

* * * * *